(12) United States Patent
Kondo et al.

(10) Patent No.: US 9,092,354 B2
(45) Date of Patent: Jul. 28, 2015

(54) STORAGE DEVICE, CRC GENERATION DEVICE, AND CRC GENERATION METHOD

(71) Applicant: Kabushiki Kaisha Toshiba, Minato-ku (JP)

(72) Inventors: Yosuke Kondo, Kanagawa (JP); Kenji Yoshida, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 167 days.

(21) Appl. No.: 14/018,676

(22) Filed: Sep. 5, 2013

(65) Prior Publication Data

US 2015/0019932 A1    Jan. 15, 2015

(30) Foreign Application Priority Data

Jul. 11, 2013  (JP) .................................. 2013-145767

(51) Int. Cl.
*G06F 11/00*   (2006.01)
*G06F 11/10*   (2006.01)

(52) U.S. Cl.
CPC .................................. *G06F 11/1008* (2013.01)

(58) Field of Classification Search
CPC . G06F 11/1008; H03M 13/091; H03M 13/29; H03M 13/17

USPC .................................. 714/776, 807, 801, 758
See application file for complete search history.

(56) References Cited

U.S. PATENT DOCUMENTS

| 6,173,340 | B1 * | 1/2001  | Gready et al. ..................... 710/6 |
| 6,434,717 | B1   | 8/2002  | Fujii |
| 6,519,738 | B1   | 2/2003  | Derby |
| 6,868,517 | B1 * | 3/2005  | Feng et al. ..................... 714/758 |
| 7,793,194 | B2 * | 9/2010  | Seo et al. ..................... 714/776 |
| 8,578,240 | B1 * | 11/2013 | Pathakota et al. ............. 714/758 |
| 2002/0083392 | A1 | 6/2002 | Kim et al. |
| 2009/0077456 | A1 * | 3/2009 | Pi et al. ......................... 714/807 |
| 2010/0198892 | A1 * | 8/2010 | Motozuka ..................... 708/207 |

* cited by examiner

*Primary Examiner* — David Ton
(74) *Attorney, Agent, or Firm* — Oblon, McClelland, Maier & Neustadt, L.L.P.

(57) ABSTRACT

According to one embodiment, storage device, a CRC generator device and a CRC generation method includes A storage device includes: a storage unit 1, a data reading unit 2, and a CRC generation device 3. The CRC generation device 3 includes a CRC generation unit 31 generates a first CRC value; an ECC unit 32 detects an error sequence in a reverse order; a CRC reverse operation unit 33 calculates a CRC reverse operation result for the error sequence; a CRC generation shift register group 34 to retain CRC conversion information; an error sequence CRC generation unit 35 obtains a second CRC value; and an XOR unit 36 obtains a CRC value for an errorless recording sequence.

16 Claims, 9 Drawing Sheets

FIG.9A $$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

FIG.9B $$\begin{bmatrix} 0 & 1 & 0 & 0 \\ 1 & 0 & 0 & 0 \\ 0 & 0 & 1 & 1 \\ 0 & 1 & 1 & 0 \end{bmatrix}$$

STORAGE DEVICE, CRC GENERATION DEVICE, AND CRC GENERATION METHOD

CROSS-REFERENCE TO RELATED APPLICATIONS

This application is based upon and claims the benefit of priority from Japanese Patent Application No. 2013-145767, filed on Jul. 11, 2013; the entire contents of which are incorporated herein by reference.

FIELD

Embodiments described herein relate generally to a storage device, a CRC generation device, and a CRC generation method.

BACKGROUND

For calculating a Cyclic Redundancy Check (CRC) value for an errorless recording sequence from a playback sequence including errors, the CRC value can be calculated by generating CRC value for the error sequence and performing an exclusive OR operation between CRC value for the playback sequence and CRC value for the error sequence. In case where the error sequence can be obtained only in reversed order with respect to the playback sequence, however, it is necessary to wait for end of error correction processing and then recalculate a CRC value with the playback sequence subjected to the error correction. In this case, it is necessary to retain the playback sequence subjected to the error correction in a buffer for CRC recalculation. This poses a problem that latency (delay time) of data transfer becomes large.

BRIEF DESCRIPTION OF THE DRAWINGS

FIGS. 9A and 9B are diagrams showing unit matrixes that represent states of shift registers shown in FIGS. 8A and 8B;

DETAILED DESCRIPTION

In general, according to one embodiment, storage device, a CRC generator device, and a CRC generation method includes A storage device of an embodiment according to the present invention includes: a storage unit store a recording sequence, which is a data sequence; a data reading unit output a playback sequence including errors with respect to the recording sequence, read out from the storage unit; and a CRC generation device generate a CRC value for the errorless recording sequence on the basis of the playback sequence including errors which is output from the data reading unit. The CRC generation device includes a first CRC generation unit generate a first CRC value for the playback sequence. The CRC generation device includes an error detection unit detects errors in the playback sequence and generate an error sequence which indicates locations of the errors in the playback sequence, in a reverse order in which the output order is reversed with respect to the playback sequence. The CRC generation device includes a CRC reverse operation unit input the error sequence in the reverse order generated by the error detection unit, and calculates a CRC reverse operation result for the input error sequence. The CRC generation device includes a CRC conversion information retention unit retain CRC conversion information, which is the information to be used to generate a CRC value for an error sequence in a regular order which is same in the output order as the playback sequence from the CRC reverse order operation result. The CRC generation device includes a second CRC generation unit to calculate a second CRC value, which is a CRC value for the error sequence obtained in the regular order, by using the CRC reverse operation result generated by the CRC reverse operation unit and the CRC conversion information retained by the CRC conversion information retention unit. In addition, the CRC generation device includes a third CRC generation unit calculates a third CRC value equivalent to the CRC value for the errorless recording sequence by using the first CRC value generated by the first CRC generation unit and the second CRC value generated by the second CRC generation unit.

Exemplary embodiments of storage device, a CRC generator device, and a CRC generation method will be explained below in detail with reference to the accompanying drawings. The present invention is not limited to the following embodiments.

First Embodiment

Figure 1:
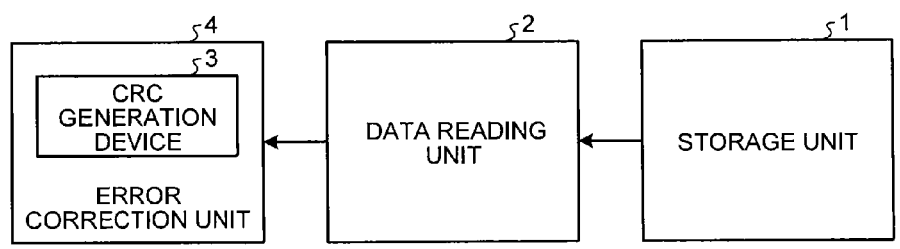
FIG. 1 is a diagram showing a configuration example of a storage device according to a first embodiment.

FIG. 1 is a diagram illustrating a configuration example of a storage device according to a first embodiment. The storage device includes a storage unit 1, a data reading unit 2, and an error correction unit 4 having a CRC generation device 3. The storage unit 1 is a storage unit configured to store a recording sequence which is a data sequence. For example, there is a semiconductor memory such as a NAND flash memory. However, the storage unit 1 is not restricted to the semiconductor memory. The data reading unit 2 outputs a playback sequence, which includes an error with respect to the recording sequence, read out from the storage unit 1 to the error correction unit 4. The error correction unit 4 executes error correction processing, which includes CRC value generation processing for the errorless recording sequence executed in the CRC generation device, based on the playback sequence including errors which is output from the data reading unit 2. It is supposed that the playback sequence read out by the data reading unit 2 has the recording sequence stored in the storage unit 1 with errors added (with an error sequence included).

Figure 2:
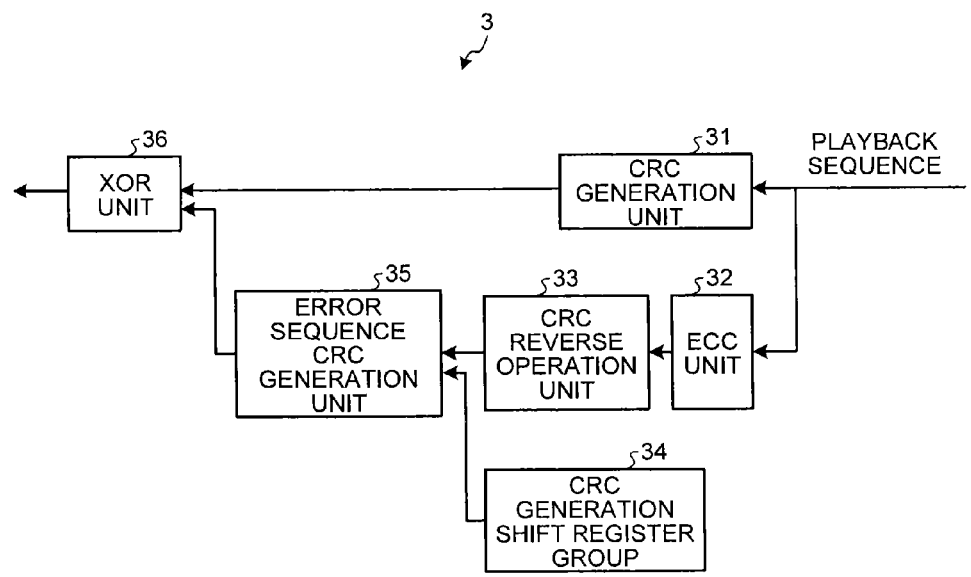
FIG. 2 is a diagram showing a configuration example of a CRC generation device according to the first embodiment.

A configuration of the CRC generation device 3 will now be described. FIG. 2 is a diagram illustrating a configuration example of the CRC generation device according to the first embodiment. The CRC generation device 3 includes a CRC generation unit 31, an Error Correcting Code or Error Checking and Correcting (ECC) unit 32, a CRC reverse operation unit 33, a CRC generation shift register group 34, an error sequence CRC generation unit 35, and an exclusive OR operation (XOR) unit 36.

The CRC generation unit 31 is a first CRC generation unit, to which the playback sequence read out from the storage unit 1 by the data reading unit 1 is input in the regular order, and which generates a CRC value (a first CRC value) for the playback sequence and outputs the CRC value to the XOR unit 36. The CRC generation unit 31 includes therein shift registers having as many stages as the degree of a generation polynomial used to generate the CRC value (the first CRC value) for the playback sequence.

Here, "the playback sequence is input in the regular order" indicates an input order in which the playback sequence is input in order from a Most Significant Bit (MSB) side and finally a Least Significant Bit (LSB) is input. By the way, "the playback sequence is input in the reverse order" which will be described later indicates an input order that is the reverse of the regular order. In the reverse order, the playback sequence is input in order from the LSB side and finally the MSB is input.

The ECC unit 32 is an error detection unit to which the playback sequence read out from the storage unit 1 by the data reading unit 2 is input in the regular order and which executes error detection on the playback sequence. As the error detection, there is, for example, a chien search in the decoding process of a BCH code. However, the error detection is not restricted to the chien search. The ECC unit 32 outputs an error sequence obtained as a result of the error detection to the CRC reverse operation unit 33 in a reverse order with respect to the playback sequence. The error sequence is a sequence indicating locations of erroneous bits in the playback sequence with respect to the recording sequence.

The CRC reverse operation unit 33 inputs the error sequence obtained by the ECC unit 32 in the reverse order. The CRC reverse operation unit 33 performs a reverse operation of CRC on the error sequence in the reverse order, and outputs a reverse operation result of CRC to the error sequence CRC generation unit 35. The CRC reverse operation unit 33 includes therein shift registers having as many stages as the degree of a generation polynomial used in CRC reverse operation for the error sequence in the reverse order. The number of stages of the shift registers is the same as that of the CRC generation unit 31.

The CRC generation shift register group 34 includes a plurality of circuits, and each of the circuits includes as many shift registers as those included in each of the CRC generation unit 31 and the CRC reverse operation unit 33. Specifically, if each of the CRC generation unit 31 and the CRC reverse operation unit 33 includes four shift registers (that is, the degree of the generation polynomial is four), the CRC generation shift register group 34 includes $4^2=16$ shift registers, and has four kinds of circuits each including four shift registers. The CRC generation shift register group 34 is a CRC conversion information retention unit configured to retain CRC conversion information which is used by the error sequence CRC generation unit 35 when generating a CRC value (a second CRC value) for the error sequence in the regular order. Details of the CRC conversion information will be described later.

The error sequence CRC generation unit 35 is a second CRC generation unit configured to generate the CRC value (the second CRC value) for the error sequence in the regular order by using the CRC reverse operation result for the error sequence in the reverse order acquired from the CRC reverse operation unit 33 and the CRC conversion information acquired from the CRC generation shift register group 34.

The error sequence CRC generation unit 35 outputs the generated CRC value (the second CRC value) for the error sequence in the regular order to the XOR unit 36.

The XOR unit 36 is a third CRC generation unit configured to generate a CRC value for an errorless playback sequence, i.e., a CRC value (a third CRC value) equivalent to a CRC value for the recording sequence by using the CRC value (the first CRC value) for the playback sequence acquired from the CRC generation unit 31 and the CRC value (the second CRC value) for the error sequence in the regular order acquired from the error sequence CRC generation unit 35.

Figure 3:
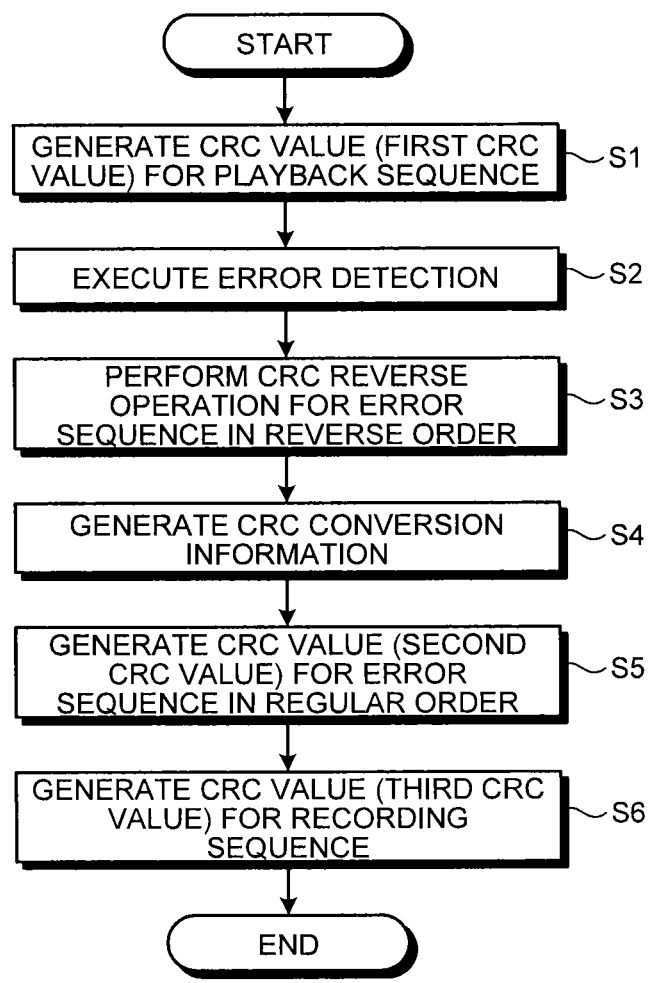
FIG. 3 is a flow chart showing CRC value generation processing in the CRC generation device.

Subsequently, an operation executed in the CRC generation device 3 until the CRC value for the recording sequence is generated will be described in detail. FIG. 3 is a flow chart illustrating CRC value generation processing in the CRC generation device.

First, in the CRC generation device 3, the playback sequence read out from the storage unit 1 by the data reading unit 2 is input to the CRC generation unit 31 in the regular order. The CRC generation unit 31 generates the CRC value (the first CRC value) for the playback sequence (step S1). The CRC generation unit 31 outputs the CRC value (the first CRC value) for the playback sequence to the XOR unit 36.

Figure 4:
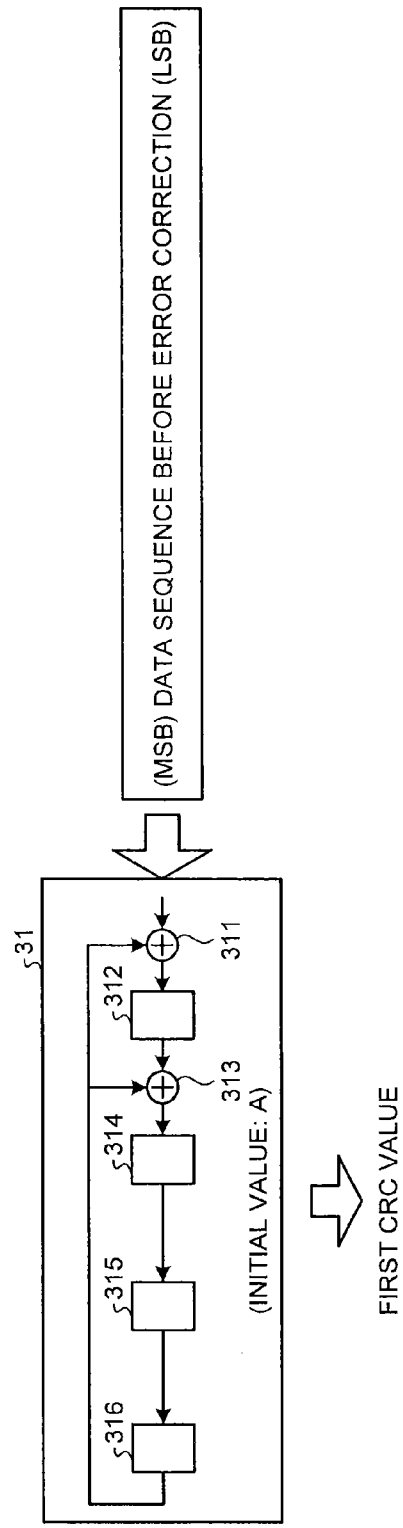
FIG. 4 is a diagram showing CRC value generation processing in a CRC generation unit.

FIG. 4 is a diagram illustrating CRC value generation processing in the CRC generation unit. The CRC generation unit 31 includes an exclusive OR operation unit 311, a shift register 312, an exclusive OR operation unit 313, and shift registers 314, 315 and 316. The exclusive OR operation unit 311 performs an exclusive OR operation by taking the playback sequence read out from the storage unit 1 by the data reading unit 2 and an output bit from the shift register 316 as inputs, and outputs an operation result to the shift register 312. The exclusive OR operation unit 313 performs an exclusive OR operation by taking an output bit from the shift register 312 and an output bit from the shift register 316 as inputs, and outputs an operation result to the shift register 314. In general, an operation circuit of a CRC value can be achieved by using shift registers. Here, a case in which the degree of the generation polynomial is four (a case in which the number of shift registers is four) will be described as an example.

In the CRC generation unit 31, an arbitrary initial value (supposed to be an initial value A as an example) is set in the respective shift registers 312 and 314 to 316, and the playback sequence is input in the regular order from the MSB side. And the CRC generation unit 31 inputs the playback sequence corresponding to the predetermined number of data. The CRC generation unit 31 performs a bit shift operation. After the bit shift operation, the CRC generation unit 31 outputs a value ("zero" or "one") retained by respective shift registers 312 and 314 to 316 as the CRC value (the first CRC value). The predetermined number of data is based upon a unit of a code word for which the CRC value is generated, for example, an address unit administered in a system of the storage device in FIG. 1. Hereafter, the same holds true.

Then, in the CRC generation device 3, the ECC unit 32 inputs the playback sequence read out from the storage unit 1 by the data reading unit 2 in the regular order. The ECC unit 32 executes error detection on the playback sequence (step S2). Here, the ECC unit 32 outputs the obtained error sequence to the CRC reverse operation unit 33 in a reverse order with respect to the playback sequence. As for a method of detecting errors from the playback sequence and outputting an error sequence in the reverse order, it can be obtained by using a method similar to a past method (for example, such as BCH). Therefore, detailed description will be omitted.

Referring back to FIG. 3, then the CRC reverse operation unit 33 inputs the error sequence obtained by the ECC unit 32 in the reverse order, and performs CRC reverse operation on the error sequence in the reverse order (step S3). The CRC reverse operation unit 33 outputs a CRC reverse operation result obtained by performing the CRC reverse operation on the error sequence in the reverse order to the error sequence CRC generation unit 35.

Figure 5:
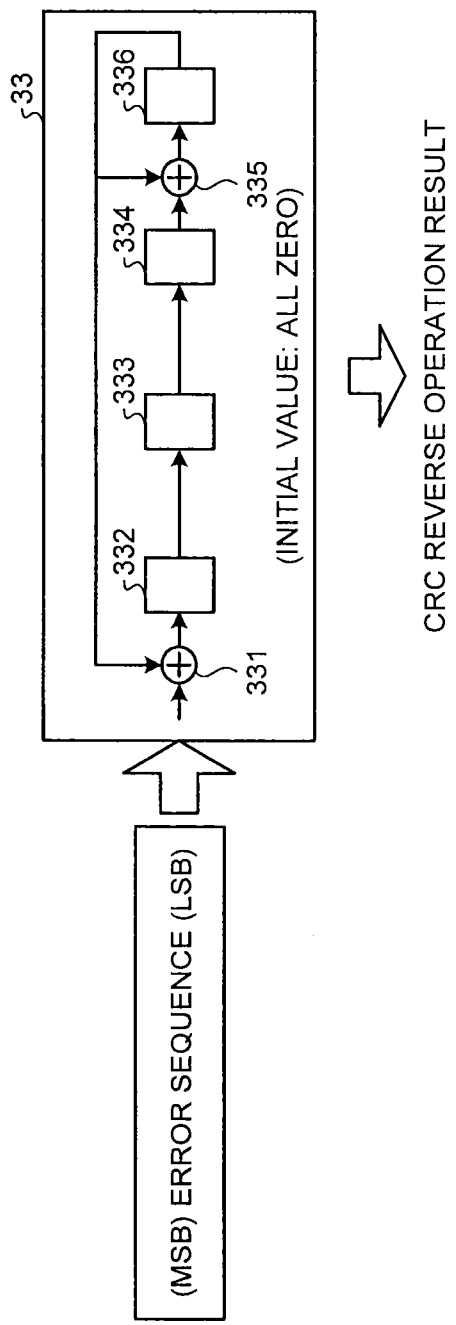
FIG. 5 is a diagram showing generation processing of a CRC reverse operation result in a CRC reverse operation unit.

FIG. 5 is a diagram illustrating generation processing of the CRC reverse operation result in the CRC reverse operation unit. The CRC reverse operation unit 33 includes an exclusive OR operation unit 331, shift registers 332, 333, and 334, an exclusive OR operation unit 335, and a shift register 336. The exclusive OR operation unit 331 performs an exclusive OR operation by taking the error sequence which is input from the ECC unit 32 and an output bit from the shift register 336 as inputs, and outputs a result of the operation to the shift register 332. The exclusive OR operation unit 335 performs an exclusive OR operation by taking an output bit from the shift register 334 and an output bit from the shift register 336 as inputs, and outputs a result of the operation to the shift register 336. In the same way as the CRC generation unit 31, a case in which the degree of the generation polynomial is four (a case in which the number of shift registers is four) will be described as an example.

The CRC reverse operation unit 33 sets an initial value of all zero in respective shift registers 332 to 334 and 336, and inputs the error sequence in the reverse order from the LSB side. And the CRC reverse operation unit 33 inputs the error sequence corresponding to the predetermined number of data. The CRC reverse operation unit 33 performs a bit shift operation. After the bit shift operation, the CRC reverse operation unit 33 outputs a value ("zero" or "one") retained by respective shift registers 332 to 334 and 336 as the CRC reverse operation result for the error sequence in the reverse order.

Referring back to FIG. 3, the CRC generation shift register group 34 generates the CRC conversion information to be used by the error sequence CRC generation unit 35 when generating the CRC value (the second CRC value) for the error sequence in the regular order (step S4).

Here, the CRC conversion information to be used by the error sequence CRC generation unit 35 when generating the CRC value (the second CRC value) for the error sequence in the regular order will be described.

Figure 6:
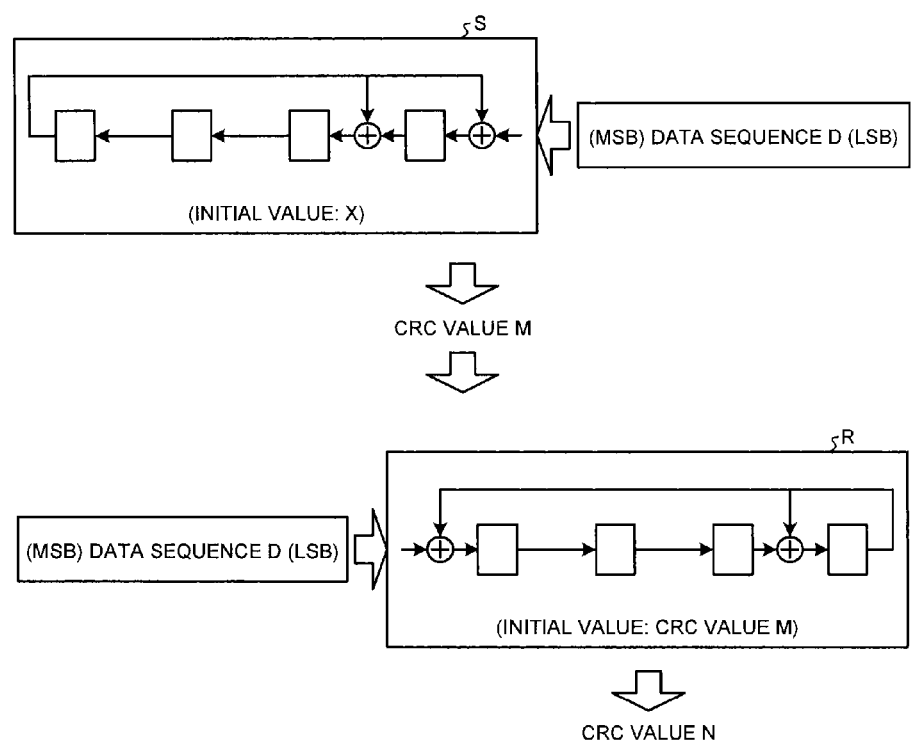
FIG. 6 is a diagram showing a reverse operation method of a CRC value.

First, reverse operation of the CRC value will be described. FIG. 6 is a diagram illustrating a reverse operation method of the CRC value. In FIG. 6, a shift register group S has the same configuration as that of the CRC generation unit 31, and a reverse shift register group R has the same configuration as that of the CRC reverse operation unit 33. The shift register group S having an initial value X inputs a data sequence D corresponding to the predetermined number of data in the regular order from the MSB side and performs a bit shift operation. As a result, a CRC value M is obtained. This CRC value M is set as an initial value of the reverse shift register group R which performs a bit shift operation in a direction opposite to that of the bit shift direction in the shift register group S. The data sequence D corresponding to the predetermined number of data is input to the reverse shift register group R in the reverse order from the LSB side. The reverse shift register group R performs a bit shift operation. As a result, a CRC value N is obtained. The CRC value N is the same as the initial value X of the shift register group S. Even if the initial value is unknown, the initial value X can be obtained by performing a reverse operation of the CRC in this way as long as the data sequence D, the CRC value M generated from the data sequence D, and the generation polynomial of the CRC are known.

Figure 7:
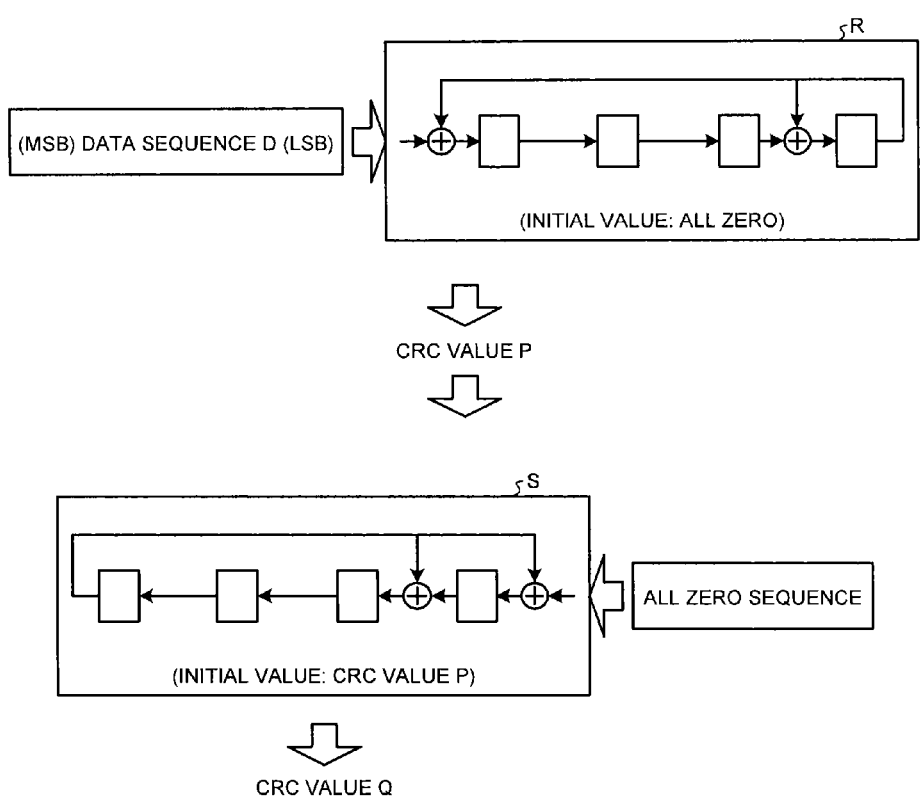
FIG. 7 is a diagram showing an application example of the reverse operation of the CRC value.

An application example of the reverse operation of the CRC value will now be described. FIG. 7 is a diagram illustrating an application example of the reverse operation of the CRC value. The data sequence D corresponding to the predetermined number of data is input to a reverse shift register group R having all zero initial values in the reverse order from the LSB side. The reverse shift register group R performs a bit shift operation. As a result, a CRC value P is obtained. The CRC value P is set as an initial value of a shift register group S. And the shift register group S inputs data of all zero (sequence) corresponding to the predetermined number of data and performs a bit shift operation. As a result, a CRC value Q is obtained. The CRC value Q coincides with a CRC value obtained by inputting the data sequence D to the shift register group S having the CRC value P as the initial value in a reversed order with respect to the order in which the data sequence D is input to the reverse shift register group R, i.e., in the regular order from the MSB side.

In FIG. 5, the reverse operation result of CRC for the error sequence in the reverse order generated by the CRC reverse operation unit 33 is equivalent to the CRC value P in the example illustrated in FIG. 7. Therefore, a CRC value obtained by inputting a data sequence of all zero (sequence) corresponding to the predetermined number of data to the shift register group S having a CRC reverse operation result for the error sequence in the reverse order as the initial value and performing a bit shift operation coincides with the CRC value (the second CRC value) obtained by inputting the error sequence corresponding to the predetermined number of data to the shift register group S having all zero as the initial value, in the regular order and performing a bit shift operation. As described in BACKGROUND, a CRC value (equivalent to the third CRC value) for the errorless recording sequence can be calculated by performing an exclusive OR operation between a CRC value (equivalent to the first CRC value) for the playback sequence and a CRC value (equivalent to the second CRC value) for the error sequence.

Even if the error sequence becomes the reverse order, the CRC value (the third CRC value) for the errorless recording sequence can be calculated in this way in the same way as the cases where the error sequence is in the regular order. If the operation method of the CRC value illustrated in FIG. 7 is executed in the CRC generation device 3, however, the CRC reverse operation unit 33 obtains a reverse operation result of CRC for the error sequence in the reverse order and then starts next operation of the CRC value. Therefore, there is a fear that latency (delay time) of data transfer will increase.

If states within a shift register can be previously obtained when a certain initial value is given to the shift register and all zero data corresponding to the predetermined number of data is input and a bit shift operation is performed, therefore, the CRC value (the second CRC value) for the error sequence in the regular order obtained by causing the shift register to perform a bit shift operation corresponding to the predetermined number of data can be obtained without setting the reverse operation result of CRC for the error sequence in the reverse order as the initial value and inputting data from the external. Accordingly, the CRC generation shift register group 34 is used in order to obtain the internal state of the shift register when a certain initial value is given to the shift register, all zero data corresponding to the predetermined number of data is input to the shift register, and the shift register is caused to perform a bit shift operation.

Figure 8A:
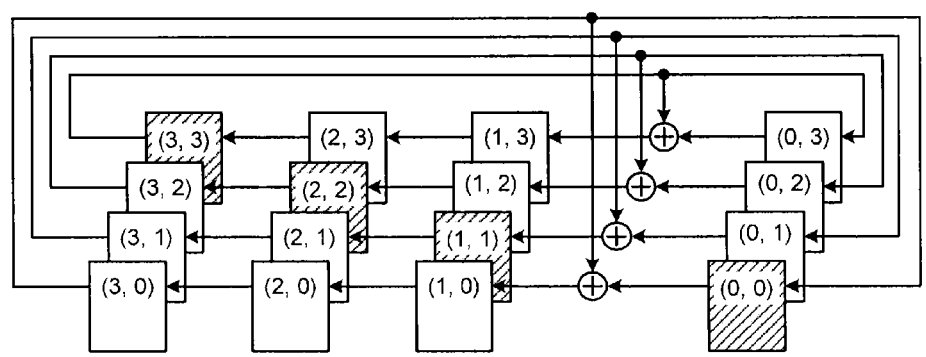
FIGS. 8A and 8B are diagrams showing states of respective shift registers in a CRC generation shift register group.
Figure 8B:
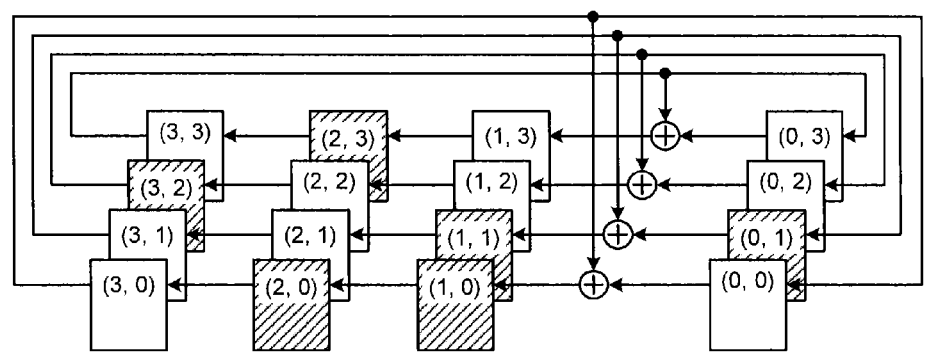

FIGS. 8A and 8B are diagrams illustrating states of respective shift registers in the CRC generation shift register group. FIG. 8A illustrates states of respective shift registers in the initial state in the CRC generation shift register group. FIG. 8B illustrates states of respective shift registers in a state in which a bit shift operation corresponding to the predetermined number of data is performed in the CRC generation shift register group. The bit shift operation corresponding to the predetermined number of data is the same as the bit shift operation corresponding to the predetermined number of data in the CRC generation unit 31 and the CRC reverse operation unit 33. Every four shift registers constitute one circuit. In each circuit, arrangement of shift registers is the same as that in the CRC generation unit 31. In FIG. 8A, an initial value "zero" is given to a plain shift register, and an initial value "one" is given to a colored shift register. If a bit shift operation corresponding to the predetermined number of data is performed, values in the shift registers change as illustrated in FIG. 8B. In the same way as FIG. 8A, a plain shift register indicates "zero" and a colored shift register indicates "one".

In FIG. 8A, initial values of shift register numbers (0, 0), (1, 1), (2, 2) and (3, 3) are set to "one". Four lowermost shift registers obtain which shift register has a value of "one" when the initial value of the rightmost shift register (the shift register 312 in FIG. 4) is "one" and a bit shift operation corresponding to the predetermined number of data is performed. Obtained values of the shift registers are indicated by the four lowermost shift registers in FIG. 8B. Four second lowermost shift registers obtain which shift register has a value of "one" when the initial value of the second rightmost shift register (the shift register 314 in FIG. 4) is "one" and a bit shift operation corresponding to the predetermined number of data is performed. Obtained values of the shift registers are indicated by the four second lowermost shift registers in FIG. 8B. Four third lowermost shift registers obtain which shift register has a value of "one" when the initial value of the third rightmost shift register (the shift register 315 in FIG. 4) is "one" and a bit shift operation corresponding to the predetermined number of data is performed. Obtained values of the shift registers are indicated by the four third lowermost shift registers in FIG. 8B. Four uppermost shift registers obtain which shift register has a value of "one" when the initial value of the leftmost shift register (the shift register 316 in FIG. 4) is "one" and a bit shift operation corresponding to the predetermined number of data is performed. Obtained values of the shift registers are indicated by the four uppermost shift registers in FIG. 8B.

In cases where the initial value in shift registers in the CRC generation shift register group 34 is, for example, "0110," an exclusive OR operation on initial values in the second lowermost and the third lowermost shift register groups among the four shift register groups illustrated in FIG. 8A yields "0110." In the CRC generation shift register group 34, therefore, the CRC value, i.e., values in shift registers when a bit shift operation corresponding to the predetermined number of data is performed with the initial value "0110" can be obtained by performing an exclusive OR operation on values in the second lowermost shift registers and the third lowermost shift registers among the four shift register groups illustrated in FIG. 8B when a bit shift operation corresponding to the predetermined number of data is performed.

If the states of the respective shift registers in the CRC generation shift register group 34 illustrated in FIG. 8 are represented in a form of a matrix, the matrix can be represented as illustrated in FIGS. 9A and 9B. FIGS. 9A and 9B are diagrams illustrating unit matrixes that represent states of shift registers illustrated in FIGS. 8A and 8B. FIG. 9A illustrates a unit matrix that represents states of initial values in the shift registers. FIG. 9B illustrates a matrix that represents states in which a bit shift operation corresponding to the predetermined number of data is performed in the shift registers.

Before the CRC generation device 3 is started, the CRC generation shift register group 34 retains values in the shift registers in the state illustrated in FIG. 8A (FIG. 9A). After the CRC generation device 3 is started, the CRC generation shift register group 34 performs a bit shift operation corresponding to the predetermined number of data and retains values in the shift registers in the state illustrated in FIG. 8B (FIG. 9B). At this time, information concerning values in the shift registers retained in the state illustrated in FIG. 8B (FIG. 9B) after the bit shift operation corresponding to the predetermined number of data is information equivalent to values in respective shift registers after the predetermined number of data is input to the CRC generation unit 31 and the bit shift operation is performed. This information is referred to as CRC conversion information. After the CRC generation device 3 is started, the CRC generation shift register group 34 generates the CRC conversion information and outputs the CRC conversion information to the error sequence CRC generation unit 35.

The CRC generation shift register group 34 includes a plurality of shift registers, and retains a result obtained by performing an operation using the plurality of shift registers, as the CRC conversion information.

Referring back to FIG. 3, then the error sequence CRC generation unit 35 generates the CRC value (the second CRC value) for the error sequence in the regular order by using the CRC reverse operation result for the error sequence in the reverse order acquired from the CRC reverse operation unit 33 and the CRC conversion information acquired from the CRC generation shift register group 34 (step S5).

Figure 10:
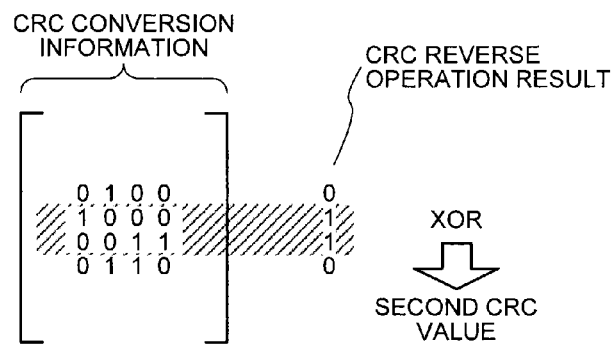
FIG. 10 is a diagram showing a method for converting a CRC value for an error sequence in a reverse order to a CRC value for an error sequence in a regular order.

FIG. 10 is a diagram illustrating a method for converting the CRC value for the error sequence in the reverse order to the CRC value for the error sequence in the regular order. The error sequence CRC generation unit 35 can calculate the CRC value (the second CRC value) for the error sequence in the regular order by performing an exclusive OR operation between rows in the matrix of the CRC conversion information corresponding to locations having a value "one" in the CRC reverse operation result for the error sequence for the error sequence in the reverse order acquired from the CRC reverse operation unit 33. For example, as illustrated in FIG. 10, it is supposed that the CRC reverse operation result for the error sequence in the reverse order acquired from the CRC reverse operation unit 33 is "0110" with respect to the CRC conversion information from the CRC generation shift register group 34. In this case, the error sequence CRC generation unit 35 can acquire a value "1011" by performing an exclusive OR operation on rows of "1000" and "0011" in the CRC conversion information that correspond to locations having a value "one" in the CRC reverse operation result for the error sequence in the reverse order. This value of "1011" becomes a CRC value obtained when all zero data corresponding to the predetermined number of data is input and a bit shift operation is performed by the shift registers, i.e., the CRC value (the second CRC value) for the error sequence in the regular order. The error sequence CRC generation unit 35 outputs the generated CRC value (second CRC value) for the error sequence in the regular order to the XOR unit 36.

By the way, it is described that the CRC generation shift register group 34 outputs the CRC conversion information to the error sequence CRC generation unit 35, and the error sequence CRC generation unit 35 uses the CRC conversion information acquired from the CRC generation shift register group 34. However, it is not restrictive. For example, the error sequence CRC generation unit 35 may read only information of necessary portions in the CRC conversion information from the CRC generation shift register group 34 on the basis of the CRC reverse operation result for the error sequence in the reverse order acquired from the CRC reverse operation unit 33.

Referring back to FIG. 3, the XOR unit 36 performs an exclusive OR operation by using the CRC value (the first CRC value) for the playback sequence acquired from the CRC generation unit 31 and the CRC value (the second CRC value) for the error sequence in the regular order acquired from the error sequence CRC generation unit 35, and generates the CRC value for the errorless playback sequence, i.e., the CRC value (the third CRC value) equivalent to the CRC value for the recording sequence (step S6).

In this way, the operation of obtaining the CRC conversion information in the CRC generation shift register group 34 is independent of the operation of obtaining the CRC reverse operation result for the error sequence in the reverse order illustrated in FIG. 5 in the CRC reverse operation unit 33. In the generation processing of the CRC value (the third CRC value) for the recording sequence in the CRC generation device 3, therefore, the operation of obtaining the CRC conversion information in the CRC generation shift register group 34 can be executed until the CRC reverse operation result for the error sequence in the reverse order illustrated in FIG. 5 is obtained in the CRC reverse operation unit 33, or in parallel with the operation of obtaining the CRC reverse operation result for the error sequence in the reverse order illustrated in FIG. 5. In the error sequence CRC generation unit 35, the CRC conversion information from the CRC generation shift register group 34 can be acquired until the CRC reverse operation result for the error sequence in the reverse order is acquired from the CRC reverse operation unit 33, or in parallel with the operation of acquiring the CRC reverse operation result for the error sequence in the reverse order.

According to the first embodiment, in cases where the CRC reverse operation result for the error sequence in the reverse order is generated in the CRC reverse operation unit 33 in the CRC generation device 3, the CRC generation shift register unit 34 can obtain the CRC conversion information, which represents the states of the shift registers when some initial values are set in the shift registers and a bit shift operation corresponding to the same number of data as that in the error sequence is performed, independently of the operation in the CRC reverse operation unit, as described above. And the error sequence CRC generation unit 35 calculates the CRC value (the second CRC value) for the error sequence in the regular order by using the CRC reverse operation result for the error sequence in the reverse order and the CRC conversion information. The XOR unit 36 can calculate the CRC value (the third CRC value) for the errorless recording sequence by using the CRC value (the first CRC value) for the playback sequence and the CRC value (the second CRC value) for the error sequence in the regular order. As a result, also in cases where an error sequence in the reverse order is obtained from the playback sequence, it is possible in the CRC generation device 3 to avoid in each configuration waiting for processing in a configuration in a preceding stage and reduce the latency (delay time) in data transfer.

Second Embodiment

In the first embodiment, the CRC generation shift register group 34 is used to generate and retain the CRC conversion information. However, this is not restrictive. It is also possible to previously retain the CRC conversion information in a storage unit such as a memory.

Figure 11:
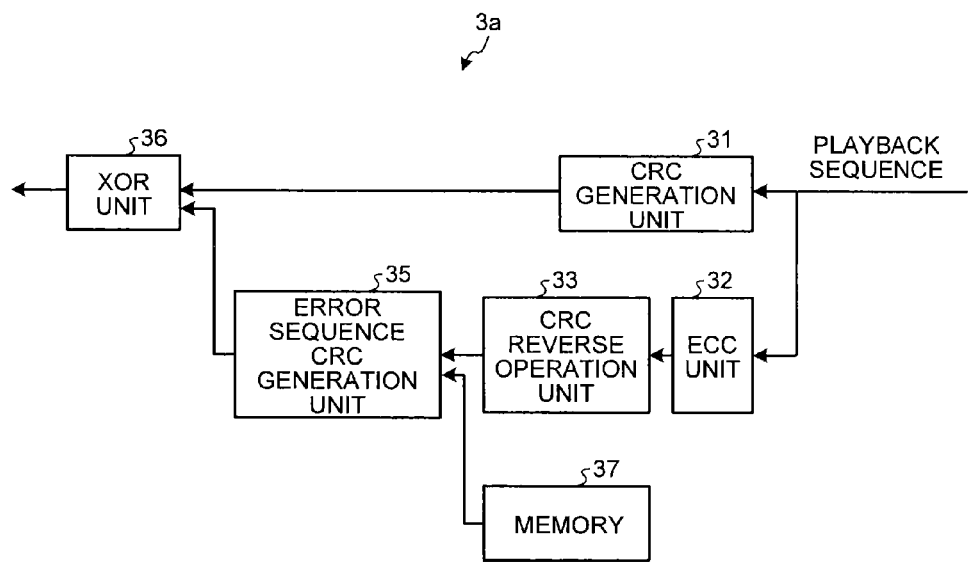
FIG. 11 is a diagram showing a configuration example of a CRC generation device according to a second embodiment.

FIG. 11 is a diagram illustrating a configuration example of a CRC generation device according to a second embodiment. A CRC generation device 3a differs from the first embodiment (see FIG. 2) in that a memory 37 is included instead of the CRC generation shift register group 34. However, other configurations and operations are the same as those in the first embodiment. In the first embodiment, the CRC generation shift register group 34 retains values in the shift registers in the state of the initial values, before the CRC generation device 3 is started. Furthermore, the CRC generation shift register group 34 retains values (CRC conversion information) in the shift registers in the state in which the bit shift operation corresponding to the predetermined number of data is performed, after the CRC generation device 3 is started. Here, the CRC generation shift register group 34 retains the CRC conversion information after the CRC generation device 3 is started, irrespective of the length of the playback sequence input to the CRC generation device 3. The CRC conversion information does not assume different values every time the CRC generation device 3 is started. Therefore, it is possible to previously store the CRC conversion information in the memory 37 in a matrix form illustrated in FIG. 9B as a CRC conversion information retention unit.

The memory 37 retains a result obtained by previously performing an operation, as the CRC conversion information.

As compared with the first embodiment, therefore, the scale of the device can be made smaller and dissipated power corresponding to the operation of the CRC generation shift register group 34 can be reduced.

In the CRC generation device 3, it is possible to not only replace the CRC generation shift register group 34 by the memory 37 but also use the CRC generation shift register group 34 and the memory 37 jointly. Furthermore, it is also possible to use a plurality of CRC generation shift register groups 34 or/and a plurality of memories 37. As a result, it is possible to set a plurality of numbers of times of the bit shift operation when performing bit shift operation corresponding to the predetermined number of data, and retain CRC conversion information corresponding to the number of times of bit shift operation.

The CRC generation devices 3 and 3a can also be applied to use other than the storage device. For example, they can also be applied to data transmitted and received between communication devices. Furthermore, the CRC generation devices 3 and 3a are not restricted to these uses as long as they are used to detect a data error. In other words, in cases where an error sequence is detected in the reverse order, the delay time can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A storage device comprising:
a storage unit configured to store a recording sequence, which is a data sequence;

a data reading unit configured to output a playback sequence including errors with respect to the recording sequence, read out from the storage unit; and a CRC generation device configured to generate a CRC value for the errorless recording sequence on the basis of the playback sequence including the errors which is output from the data reading unit, wherein the CRC generation device includes:

a first CRC generation unit configured to generate a first CRC value for the playback sequence;

an error detection unit configured to detect errors in the playback sequence and generate an error sequence which indicates locations of the errors in the playback sequence, in a reverse order in which the output order is reversed with respect to the playback sequence;

a CRC reverse operation unit configured to input the error sequence in the reverse order generated by the error detection unit, and calculate a CRC reverse operation result for the input error sequence;

a CRC conversion information retention unit configured to retain CRC conversion information, which is the information to be used to generate a CRC value for an error sequence in a regular order which is same in the output order as the playback sequence from the CRC reverse order operation result;

a second CRC generation unit configured to calculate a second CRC value, which is a CRC value for the error sequence obtained in the regular order, by using the CRC reverse operation result generated by the CRC reverse operation unit and the CRC conversion information retained by the CRC conversion information retention unit; and a third CRC generation unit configured to calculate a third CRC value equivalent to the CRC value for the errorless recording sequence by using the first CRC value generated by the first CRC generation unit and the second CRC value generated by the second CRC generation unit.

2. The storage device of claim 1, wherein the CRC conversion information retention unit is configured to retain a result obtained by calculating with using a plurality of shift registers as the CRC conversion information.

3. The storage device of claim 1, wherein the CRC conversion information retention unit is configured to retain a result obtained by previously calculating, in a memory as the CRC conversion information.

4. The storage device of claim 1, wherein the second CRC generation unit is configured to calculate the second CRC value by performing an exclusive OR operation between the CRC reverse operation result and the CRC conversion information.

5. The storage device of claim 4, wherein the third CRC generation unit is configured to calculate the third CRC value by performing an exclusive OR operation between the first CRC value and the second CRC value.

6. The storage device of claim 1, wherein the third CRC generation unit is configured to calculate the third CRC value by performing an exclusive OR operation between the first CRC value and the second CRC value.

7. A CRC generation device comprising:

a first CRC generation unit configured to generate a first CRC value for a playback sequence including errors with respect to a recording sequence which is a data sequence;

an error detection unit configured to detect errors in the playback sequence and generate an error sequence which indicates locations of the errors in the playback sequence, in a reverse order in which the output order is reversed with respect to the playback sequence;

a CRC reverse operation unit configured to input the error sequence in the reverse order generated by the error detection unit, and calculate a CRC reverse operation result for the input error sequence;

a CRC conversion information retention unit configured to retain CRC conversion information, which is the information to be used to generate a CRC value for an error sequence in a regular order which is same in the output order as the playback sequence from the CRC reverse order operation result;

a second CRC generation unit configured to calculate a second CRC value, which is a CRC value for the error sequence obtained in the regular order, by using the CRC reverse operation result generated by the CRC reverse operation unit and the CRC conversion information retained by the CRC conversion information retention unit; and a third CRC generation unit configured to calculate a third CRC value equivalent to the CRC value for the errorless recording sequence by using the first CRC value generated by the first CRC generation unit and the second CRC value generated by the second CRC generation unit.

8. The CRC generation device of claim 7, wherein the CRC conversion information retention unit is configured to retain a result obtained by calculating with using a plurality of shift registers as the CRC conversion information.

9. The CRC generation device of claim 7, wherein the CRC conversion information retention unit is configured to retain a result obtained by previously calculating, in a memory as the CRC conversion information.

10. The CRC generation device of claim 7, wherein the second CRC generation unit is configured to calculate the second CRC value by performing an exclusive OR operation between the CRC reverse operation result and the CRC conversion information.

11. The CRC generation device of claim 10, wherein the third CRC generation unit is configured to calculate the third CRC value by performing an exclusive OR operation between the first CRC value and the second CRC value.

12. The CRC generation device of claim 7, wherein the third CRC generation unit is configured to calculate the third CRC value by performing an exclusive OR operation between the first CRC value and the second CRC value.

13. A CRC generation method in a CRC generation device configured to generate a CRC value for an errorless recording sequence by using a playback sequence including errors with respect to the recording sequence which is a data sequence, the CRC generation method comprising:

generating a first CRC value for the playback sequence;

detecting errors in the playback sequence and generating an error sequence which indicates locations of the errors in the playback sequence, in a reverse order in which the output order is reversed with respect to the playback sequence;

inputting the generated error sequence in the reverse order and calculating a CRC reverse operation result for the input error sequence;

retaining CRC conversion information, which is the information to be used to generate a CRC value for an error sequence in a regular order which is same in the output order as the playback sequence from the CRC reverse order operation result;

calculating a second CRC value, which is a CRC value for the error sequence obtained in the regular order, by using the generated CRC reverse operation result and the retained CRC conversion information; and calculating a third CRC value equivalent to the CRC value for the errorless recording sequence, by using the generated first CRC value and the generated second CRC value.

14. The CRC generation method of claim 13, wherein the second CRC value is calculated by performing an exclusive OR operation between the CRC reverse operation result and the CRC conversion information.

15. The CRC generation method of claim 14, wherein the third CRC value is calculated by performing an exclusive OR operation between the first CRC value and the second CRC value.

16. The CRC generation method of claim 13, wherein the third CRC value is calculated by performing an exclusive OR operation between the first CRC value and the second CRC value.

* * * * *